US008541901B2

(12) United States Patent
Folchert et al.

(10) Patent No.: US 8,541,901 B2
(45) Date of Patent: Sep. 24, 2013

(54) WAVE POWER GENERATING INSTALLATION BASED ON THE PRINCIPLE OF THE OSCILLATING WATER COLUMN

(75) Inventors: Jörg Folchert, Bonn (DE); Axel Goelz, Koeln (DE)

(73) Assignee: RenCon GmbH (DE)

( * ) Notice: Subject to any disclaimer, the term of this patent is extended or adjusted under 35 U.S.C. 154(b) by 331 days.

(21) Appl. No.: 12/795,008

(22) Filed: Jun. 7, 2010

(65) Prior Publication Data
US 2010/0320765 A1   Dec. 23, 2010

(30) Foreign Application Priority Data

Jun. 5, 2009   (DE) .......................... 10 2009 024 276

(51) Int. Cl.
*F03B 13/10*   (2006.01)
(52) U.S. Cl.
USPC ............................................. 290/53
(58) Field of Classification Search
USPC ................... 290/53, 54, 42–44; 60/497–498, 60/502
See application file for complete search history.

(56) References Cited

U.S. PATENT DOCUMENTS

| 3,696,251 | A | 10/1972 | Last et al. | |
|---|---|---|---|---|
| 4,560,884 | A | 12/1985 | Wittecar | |
| 6,644,027 | B1 * | 11/2003 | Kelly | 60/498 |
| 8,093,743 | B2 * | 1/2012 | Bozano | 290/53 |
| 2005/0023836 | A1 * | 2/2005 | Abdalla | 290/44 |
| 2006/0233613 | A1 | 10/2006 | Welch, Jr. et al. | |
| 2009/0121487 | A1 | 5/2009 | Fraenkel | |

FOREIGN PATENT DOCUMENTS

| DE | 4331988 | 3/1995 |
|---|---|---|
| FR | 2917138 | 12/2008 |
| GB | 2145164 | 3/1985 |
| GB | 2407438 | 4/2005 |
| GB | 2431437 | 4/2007 |
| WO | 2007125538 | 11/2007 |

OTHER PUBLICATIONS

German Office Action dated Apr. 28, 2010 with English language translation, issued in German Patent Application 10 2009 024 276.7, 5 pages.

(Continued)

*Primary Examiner* — Jean F Duverne
(74) *Attorney, Agent, or Firm* — Grossman Tucker Perreault & Pfleger PLLC

(57) ABSTRACT

To increase in particular the level of efficiency in the conversion of sea wave energy into electrical energy there is proposed a wave power generating installation having a chamber for the positive guidance of an oscillating water column, wherein the chamber which is closed in itself below the surface of the water has an opening through which water flows into the chamber and then out again, and a means for taking mechanical energy from the oscillating water column and for converting the mechanical energy into electrical energy. The generating installation according to the invention is distinguished in that the means includes a float body device carried by the water column and a linear generator having a stator and an actuator, wherein the float body device is mechanically operatively connected to the actuator of the linear generator and the actuator for generating electrical energy is reciprocatingly movable by the movement of the float body device relative to the stator of the linear generator.

22 Claims, 9 Drawing Sheets

(56) References Cited

OTHER PUBLICATIONS

International Search Report and Written Opinion issued in PCT Patent Application No. PCT/EP/2010/057299 Feb. 23, 2011, 11 pages. English language version of Written Opinion provided, 6 pages.

German Examination Report dated Dec. 12, 2012 issued in German Patent Application No. 10 2009 024 276.7, with English language translation, 5 pages.

* cited by examiner

WAVE POWER GENERATING INSTALLATION BASED ON THE PRINCIPLE OF THE OSCILLATING WATER COLUMN

The invention concerns a wave power generating installation having a chamber for the positive guidance of an oscillating water column, wherein the chamber which is closed in itself below the surface of the water has an opening through which water flows into the chamber and then out again, with a means for taking mechanical energy from the oscillating water column and for converting the mechanical energy into electrical energy.

There have been ever increasing endeavours for using regenerative energy sources in recent years. That also includes the use of the wave power of the oceans, which is available on the open sea but also constantly at the coasts. The apparatus most frequently proposed for making use of wave power is a wave power generating installation of the general kind set forth, as is described for example in DE 43 31 988 C2. That arrangement has a chamber which for example stands on the sea bed in the coastal region, wherein sea water flows into and out of the chamber on the basis of the principle of communicating tubes, by virtue of the wave movement of the sea, by way of the opening which is arranged beneath the surface of the water, so that an oscillating, positively guided water column is produced in the chamber itself. Conventionally, a further opening is provided in the upper region of the chamber, in which there is air, for converting that wave power into such an OWC (oscillating water column) of the general kind set forth. Arranged in the region of that opening of the chamber is a turbine for driving a generator for generating electrical power.

Figure 2:
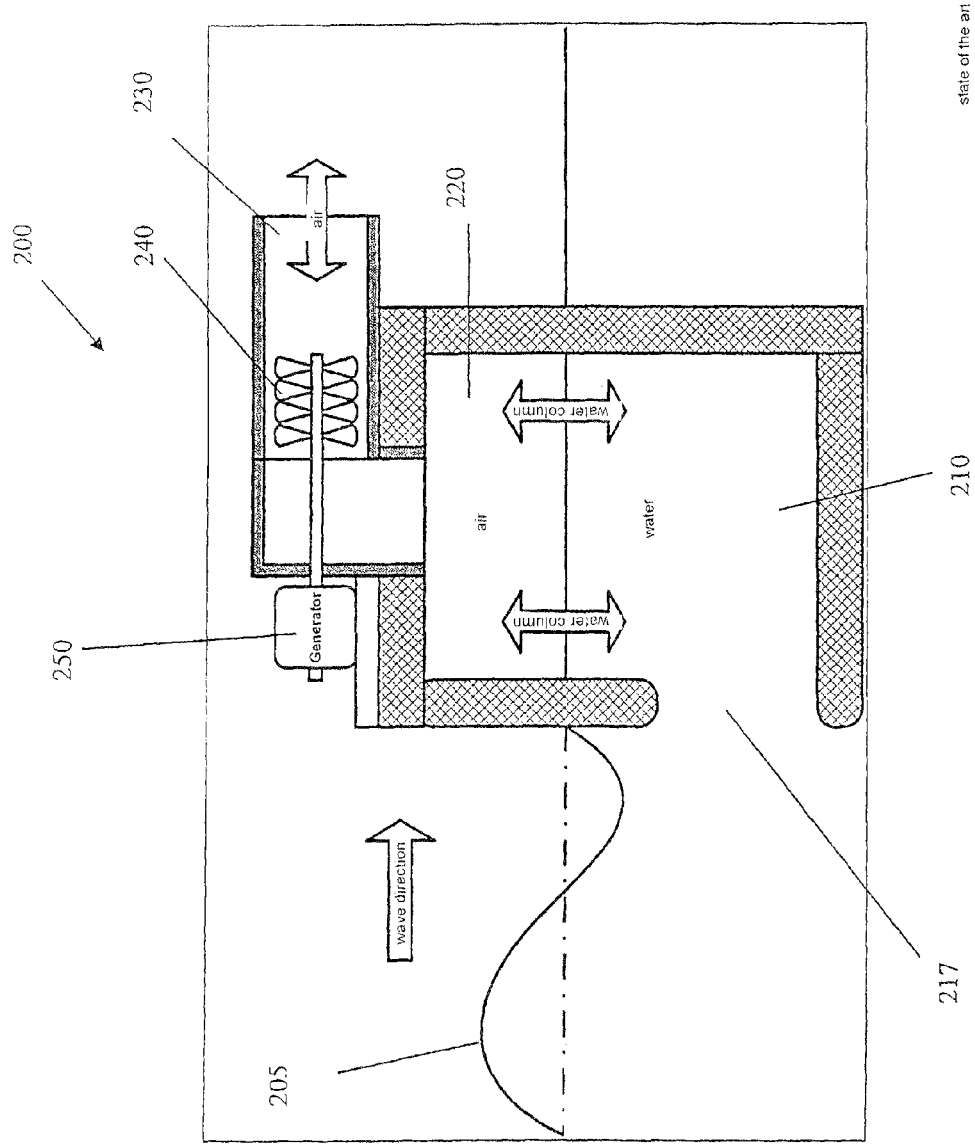

FIG. 2 shows such a conventionally designed wave power generating installation in which an oscillating water column is generated by the incoming wave 205 in the chamber 210. In that case the air in the compression chamber 220 which can narrow upwardly is compressed and expelled from the opening 230 when the water column moves upwardly. When the water column moves downwardly by virtue of the wave situation in front of the chamber so that water issues from the opening 217, air is sucked in by way of the opening 230. The air moved in that way drives a shaft turbine 240 which is distinguished in that the turbine rotates only in one predetermined direction, irrespective of the direction of flow of the air. The turbine 240 drives a generator 250 by way of a shaft to generate electrical power. In that case the generator can be mounted to the shaft within the air flow and can also be disposed outside, as shown here.

This shaft turbine which is frequently used in the OWC wave power generating installation of the general kind set forth has however a comparatively low efficiency of about 10%-70%. The theoretical maximum efficiency is 71%. By virtue of hydrodynamic and pneumatic boundary effects which are at least partially also based on compressibility of air the overall efficiency in practice of such a conventional OWC wave power generating installation is only at a maximum 17% in relation to the energy stored in the incoming waves. In addition with this conventional wave power generating installation it is comparatively difficult to optimise coupling of the exciting system, that is to say the waves in the open sea, to the oscillating system, including the inlet of the chamber, the water column, the mass of air, the turbine and the chamber outlet, and to adapt it to changing external limit conditions. To optimise the input of energy from the sea into the oscillating system, the characteristic frequency thereof should be the same as the frequency of the oncoming waves so that, depending on external conditions, the oscillating system has to be adapted. For that purpose DE 43 31 988 C2 teaches the provision of a further chamber whose volume is variable. Also known in the state of the art is braking of the turbine by way of a mechanical brake to adapt the characteristic frequency of the system to the exciter frequency. All those measures however are highly complicated and expensive or entail energy dissipation, which is contrary to the actual purpose of the apparatus. A further disadvantage linked to the use of conventional OWC wave power generating installations is linked to use of the turbine. Direct and indirect contact with salt water requires the use of corrosion-resistant materials, which greatly increases the costs of such a generating installation. In addition, by virtue of the inlet and outlet openings of the turbine, mechanical damage can occur due to articles floating in the sea, particularly if the turbine is flooded by a heavy sea swell so that ultimately the maintenance complication and expenditure is also high. A further disadvantage lies in the water/air mixture which leads to the turbine blades being retarded due to the water particles upon impinging thereon. In addition the turbine firstly has to be brought up by an external drive to a predetermined minimum speed of about 500 rpm before any energy at all can be generated. The usual working speed of such a turbine is about 1500 rpm, which on the one hand signifies a high mechanical loading for a large number of components of the generating installation and in addition also acoustic pollution of the environment so that such a generating installation tends to be prohibited in particular in the proximity of a coast.

The object of the invention is to at least partially eliminate the above-indicated disadvantages of a conventional OWC wave power generating installation.

The invention attains the foregoing object in that the means for taking mechanical energy from the oscillating water column and for converting the mechanical energy into electrical energy includes a float body device carried by the water column and a linear generator having a stator and an actuator, wherein the float body device is substantially mechanically operatively connected to the actuator of the linear generator and the actuator for generating electrical energy is reciprocatingly movable by the movement of the float body device relative to the stator of the linear generator.

The wave power generating installation according to the invention has the advantage that the linear movement of the water column is converted directly into electrical energy without transmission of the water column movement to a mass of air. It is possible to dispense with the use of a turbine so that the disadvantages linked to the turbine also disappear. The linear movement of the water column, which is received by the float body device, can be transmitted directly to the generator which is optimised for that linear movement, that is to say to the linear generator. The efficiency of such a wave power generating installation according to the invention is optimised and can be up to 74% according to simulations and series of tests performed hitherto. In addition the simplification in the principle of the generating installation affords increased operating times and lower maintenance costs. In addition the combination of the linearly moved float body with the linear generator results in a regulating option for the generating installation, which is very much better in comparison with the conventional turbine solution.

The principle of the linear generator is well known, it is based on the generation of a changing magnetic flux in a coil due to a relative movement of the actuator and the stator. In the present case the term stator is used for the part of the linear generator which is arranged immovably relative to the chamber, and accordingly the actuator is the part of the linear generator, which is moved. In that case magnetic excitation can be afforded either by the actuator or by the stator, in any case the result is a changing field flux due to the relative movement of the actuator and the stator.

Advantageous embodiments of the invention are recited in the appendant claims.

The wave power generating installation according to the invention can be arranged with a chamber fixed to the bottom and also arranged floatingly in the sea if the depth of the sea and the configuration of the chamber are suited to setting the required buoyancy. In addition the chamber can also be mounted to structures which already exist in the sea and which are natural or which are produced by the human hand, that is to say without being restricted thereto, pylons of wind power installations, cliffs, drilling platforms or buildings. In principle the linear generator can be for example of a Cartesian or also cylindrical structure, a cylindrical type is suitable in particular for installation in pile structures on platforms/weather measuring stations or also in pile foundations of wind power offshore installations.

Desirably, to produce a mechanical operative connection which can be in particular positively locking or force-locking, there can be arranged between the float body device and the actuator a plunger device which transmits the movement of the float body device to the actuator of the generator, wherein the plunger device is connected at a longitudinal end to a carrier device for carrying the actuator. The use of that plunger device has the advantage that, by virtue of the longitudinal extent of the plunger, a predetermined spacing can be set up between the float body device and thus the sea water and parts of the linear generator in order to avoid or at least reduce in particular corrosion influences of the sea water on the electrical generator.

Advantageously for absorbing transverse forces the plunger can be pivotably connected both to the float body device and also to the actuator carrier device by means of a respective hinge arrangement so that the transverse forces which possibly occur do not have to be absorbed by guides of the linear generator. The plunger itself can be rigid depending on the respective design configuration involved so that forces in the axial direction on the float body device are transmitted without losses from the plunger to the actuator carrier device. A suitable plunger material is for example steel.

On the other hand an elastic buffer device can advantageously be provided between the float body device and the actuator, for example at the plunger, at the pivotal mounting thereof and/or at the actuator carrier device, to mechanically absorb sudden shock waves and thus avoid damage to the linear generator or the guide devices. That elastic buffer device can advantageously also have damping properties.

To ensure a movement which is as linear as possible on the part of the float body device in the chamber, there can be provided a means for linear guidance of the float body device at the inside wall of the chamber. For example the float body device can be supported with peripherally mounted roller devices at the inside wall of the chamber or rolling surfaces mounted thereat, wherein the roller devices roll against the inside wall of the chamber or the rolling surface mounted thereto, in the upward and downward movement of the float body device. In addition sliding devices can also be provided at the float body device, which slide along complementary devices at the inside wall of the chamber for guiding the float body device. Preferably hard surfaces (for example steel or high-quality steel) are used here on plastic bearings, or vice-versa. Desirably the means for linear guidance of the float body device in the chamber is of such a configuration that there is no seal between the inside wall of the chamber and the float body device, which simplifies the structure of the generating installation according to the invention.

Depending on the respective embodiment involved the usual base area of a chamber of a wave power generating installation according to the invention can be a few square meters up to some hundreds of square meters. Generally the float body device extends over the entire base surface of the chamber. To simplify installation and maintenance of the float body device it may be desirable to provide a multiplicity of float bodies secured to a common carrier device to which then in particular the plunger is fixed for transmitting the linear movement of the float body device to the actuator of the generator. Depending on the respective embodiment involved those float bodies can be in the form of hollow bodies but also solid bodies. For example plastic material, GRP, steel or other sea water-resistant materials can be used as suitable materials here.

It is particularly desirable in that respect if the float bodies are removable downwardly, that is to say to the water side, after release of the fixing at the common carrier device, so that a change of a defective float body can be effected without dismantling major parts of the generating installation.

Desirably a float body can be in the form of a hollow body and on a side towards the water column can have at least one opening, wherein moreover there can be provided an actuable valve device for letting out and/or letting air into the hollow body. In that respect the opening acts as a flood opening in which water can penetrate into the float body by actuation of the valve device so that water trimming of the float body can be afforded. Desirably the float body device has a multiplicity of such trimmable float bodies to adjust the buoyancy of the overall float body device and thus for example to adapt the generating installation to the prevailing wave swell to optimise the efficiency of the generating installation in order to set an inexpensive power limitation and/or to provide for complete flooding of the float bodies to achieve storm safety for the generating installation. Optionally the float body can also be calibrated by flooding so that, upon a downward movement, due to the force of gravity, substantially more energy can be generated than by the force due to gravity of the empty float.

The chamber for receiving the oscillating water column can comprise the most widely varying materials such as concrete, steel, plastic material and the like but also composite materials. Desirably the linear generator with the two essential constituents actuator and stator is arranged outside the chamber, in which case the plunger extends movably through a chamber wall which is an upper wall relative to the water line. That configuration of the generating installation according to the invention provides that the linear generator which is sensitive in relation to corrosion can be arranged strictly separated from the sea water, which increases the service life of the wave power generating installation according to the invention or substantially reduces the maintenance complication and expenditure. Finally the linear generator can be placed in a sealed compartment, in which case a suitable sealing arrangement can be provided so that no water can penetrate into that compartment which accommodates the linear generator.

The linear movement of the water column or the float body device in the chamber provides that energy is fed to the generator substantially in the time interval in which the water column is rising. When the water column is falling the force of gravity acts on the actuator/actuator-carrier device/plunger/float body device system so that, in that time interval, the potential energy of the specified components of the generating installation is available, which energy can also be used for the downward movement of the system with the water column. To provide for more uniform energy provision in respect of the system, it is also possible to provide a gas pressure compartment operating as a gas pressure spring, in which case a portion of the wall defining the gas pressure compartment is provided by an end face of the actuator-carrier device so that the volume of the gas pressure compartment can be altered by the movement of the plunger for storing and delivering energy.

Desirably in that case the end face of the actuator-carrier device is sealed off relative to the rest of the wall of the gas pressure compartment so that the compressed gas such as for example air cannot escape and thus energy can be stored without a pressure loss in the gas pressure spring. That design configuration can provide that energy can be stored in the gas pressure spring in specific targeted fashion during the oscillation of the water column and can be delivered in a specifically targeted fashion. In most cases the gas pressure compartment is of such a configuration that energy is stored during the upward movement of the water column and is available in the downward movement of the float body device. On the other hand, in a special embodiment, by virtue of a suitable configuration, the reverse case is also possible, that is to say energy is stored in the downward movement of the float body device, which is then additionally available in the subsequent upward movement of the water column or the float body device. In addition an actuatable valve can advantageously be provided at the gas pressure compartment in order for example on the one hand to establish the energy to be stored in the gas pressure spring and/or on the other hand to take the gas pressure spring out of operation in particular in certain operating situations, on the basis of safety considerations.

In a similar embodiment the gas pressure compartment can be replaced by a mechanical spring device which is deflectable from its rest position, such as a coil spring or rubber band arrangement. In this embodiment also the spring device is mechanically operatively connected to the plunger, wherein the deflection of the spring device is variable by the movement of the plunger for the storage and delivery of energy. In that case the above-mentioned example is not to be considered limiting for the embodiments available to the experienced man skilled in the art. It will be appreciated that it is also possible to provide both a gas pressure compartment and also a mechanical spring device for the storage and delivery of energy by the movement of the plunger.

The float body can optionally also be calibrated by flooding in such a way that substantially more energy can be generated in a downward movement due to the force of gravity.

In a particularly advantageous mode of operation of the wave power generating installation according to the invention, water can be let into float bodies of the float body device shortly before and/or during the upward movement of the float body device by the actuation of one or more flood valves, so that the float body device becomes higher in weight and a greater amount of potential energy is stored during the upward movement, which can be delivered again on the downward travel. That provides for the storage of additional potential energy which is taken from the water column. Shortly before the lower reversal point of the float body device the water can be let out again to reduce the weight of the float body device again and thus to increase buoyancy. Thereafter the cycle begins afresh, which as described is correlated with the cycle of movements of the float body device.

A particularly simple structure for the wave power generating installation according to the invention is afforded if the linear generator is cylindrical and the actuator-carrier device includes a sliding tube which at its peripheral surface carries the actuator and is movable within a hollow cylinder that is stationary relative to the actuator. Desirably the sliding tube slides on the hollow cylinder so that the actuator-carrier device or the actuator is linearly guided. Particularly desirably the sliding tube can be arranged in movable sealing relationship with the hollow cylinder in order in particular to provide the above-mentioned gas pressure compartment for the specifically targeted storage and delivery of energy.

In the aforementioned embodiment it can be desirable if a bar-shaped holding device is arranged stationarily in the hollow cylinder, having a bar portion and a carrier portion carrying the stator, wherein the holding device extends substantially parallel to the axis of the hollow cylinder. That design configuration provides that the stator is arranged stationarily relative to the moving actuator on the sliding tube. Such a configuration has the advantage that supply lines can be taken to the stator on the bar portion. That can be advantageous in particular when an exciter device in the form of superconducting magnets is arranged at the stator. In that case the stator-carrier device can for example also be in the form of a cryostat, wherein at least some of the supply lines of the cryostat or the superconducting coils contained therein are guided by way of the bar portion.

In order to provide a gas pressure compartment operating as a gas pressure spring in the embodiment in which the actuator-carrier device is in the form of a sliding tube, it can be provided that the bar portion of the stator-holding device extends through a transverse wall of the sliding tube so that the stator is arranged in the interior of the sliding tube and radially adjacent to the actuator of the linear generator. In regard to the design configuration of the gas pressure compartment it is desirable in that respect if the passage of the movable bar portion through the transverse wall of the sliding tube is gas-tight. That transverse wall then acts as a piston crown, and the sliding tube correspondingly acts as a piston which changes the volume of the gas pressure compartment.

In a further advantageous embodiment the linear generator is again of a cylindrical configuration, wherein the actuator and the stator are again arranged at a radial spacing. Unlike the above-described embodiment the radially inward part of the generator can be adapted to be movable relative to the radially outwardly disposed part, that is to say the radially inwardly disposed part is moved by the float body device by way of the plunger. Desirably the actuator-carrier device here includes a cylinder which at its peripheral surface carries the actuator and which is movable within a hollow cylinder that is stationary relative to the actuator, wherein at its inside or outside peripheral surface the hollow cylinder carries the stator. In this embodiment the actuator-carrier device slides within the hollow cylinder bearing the stator, whereby the former is linearly guided. To close off the interior of the generator it can desirably be provided that the hollow cylinder, at least at the end towards the float device, has a transverse wall with an opening, through which the plunger bearing the actuator-carrier device movably extends, being fixed on the other side of its longitudinal extent to the float body device.

Advantageously, in the wave power generating installation according to the invention, adaptation of the characteristic frequency of the chamber oscillating system formed by the inlet, the water column, the float body device, the plunger and the linear generator to the frequency of the waves arriving at the chamber, for optimisation of energy transmission, can be easily effected by means of a control device by the characteristic frequency of the system being altered for example by way of a change in damping. In the wave power generating installation according to the invention the damping effect can advantageously be altered by the take-off of energy being highly accurately altered in respect of the linear generator by virtue of the precise regulating options thereof, whereby the characteristic frequency of the system can be exactly adapted. In that way for example it is possible to dispense with the complicated additional chamber of variable volume, known from the state of the art, wherein on the other hand the wave power generating installation according to the invention can also be used in conjunction with a further chamber or a so-called outer basin for better energy coupling.

In addition it may also be advantageous if there is provided a control device which implements adaptation of the characteristic frequency of the chamber oscillation system to the frequency of the waves arriving at the chamber, by trimming of the float body device by means of the actuation of at least one valve device on a float body.

In addition it can also be advantageous if there is provided a control device which implements adaptation of the characteristic frequency of the chamber oscillating system to the frequency of the waves arriving at the chamber by adjustment of an operating parameter of a spring device mechanically operatively connected to the plunger. For example suitable actuation of a valve of the above-described gas pressure spring makes it possible to alter the spring constant thereof.

The change in resonance frequency by a change in the inflow volume in the outer basin is already known from the literature.

In addition lifting the bottom plate could alter the volume in the chamber and thus also adapt the resonance characteristics.

Basically the power and force densities caused in the wave power generating installation according to the invention on the basis of an oscillating water column are unknown in conventional linear generators. It has been found however that these power and force densities arising out of the low speed of the water column can be managed in particular by the use of for example neodymium permanent magnets or superconducting magnets in a linear generator. A linear generator having electrical excitation, for example in the case of a separately excited synchronous generator or a generator with superconducting magnets affords in particular the possible option of simple working point optimisation without the known disadvantages like the necessary use of slip rings in relation to rotating systems occurring. In the case of electrically excited systems working point adjustment can be effected by a variation in the excitation current with a commercially available controlled mains power supply.

In this case the apparatus according to the invention can be used with permanently excited synchronous generators, but even more advantageously with superconducting exciter devices as they allow higher flux densities and at the same time are less sensitive to corrosion.

It may be advantageous to provide closable air openings above the surface of the water at the chamber of the wave power generating station for adjusting and/or regulating the power delivered by means of the plunger to the linear generator. Particularly in emergency situations, effective power limitation can be achieved by closing the air openings, insofar as a damping cushion is built up by compression of the air masses above the water column.

Advantageously, in the wave power generating installation according to the invention, a buffer device for absorbing shock and/or pressure forces can be arranged at the float body device, which when a predetermined linear movement of the float body device is exceeded in the chamber, bears against an inner chamber wall to limit and/or damp the movement of the float body device. That makes it possible to avoid the float body device colliding against the upper wall of the chamber in an undamped fashion in the event of an extreme input of energy into the chamber such as an extreme sea swell. The man skilled in the art realises that for that purpose it can also be provided that the buffer device is arranged at an inner chamber wall, at which then the float body device is supported when a predetermined linear movement is exceeded, to limit and/or damp the movement.

Figure 1:
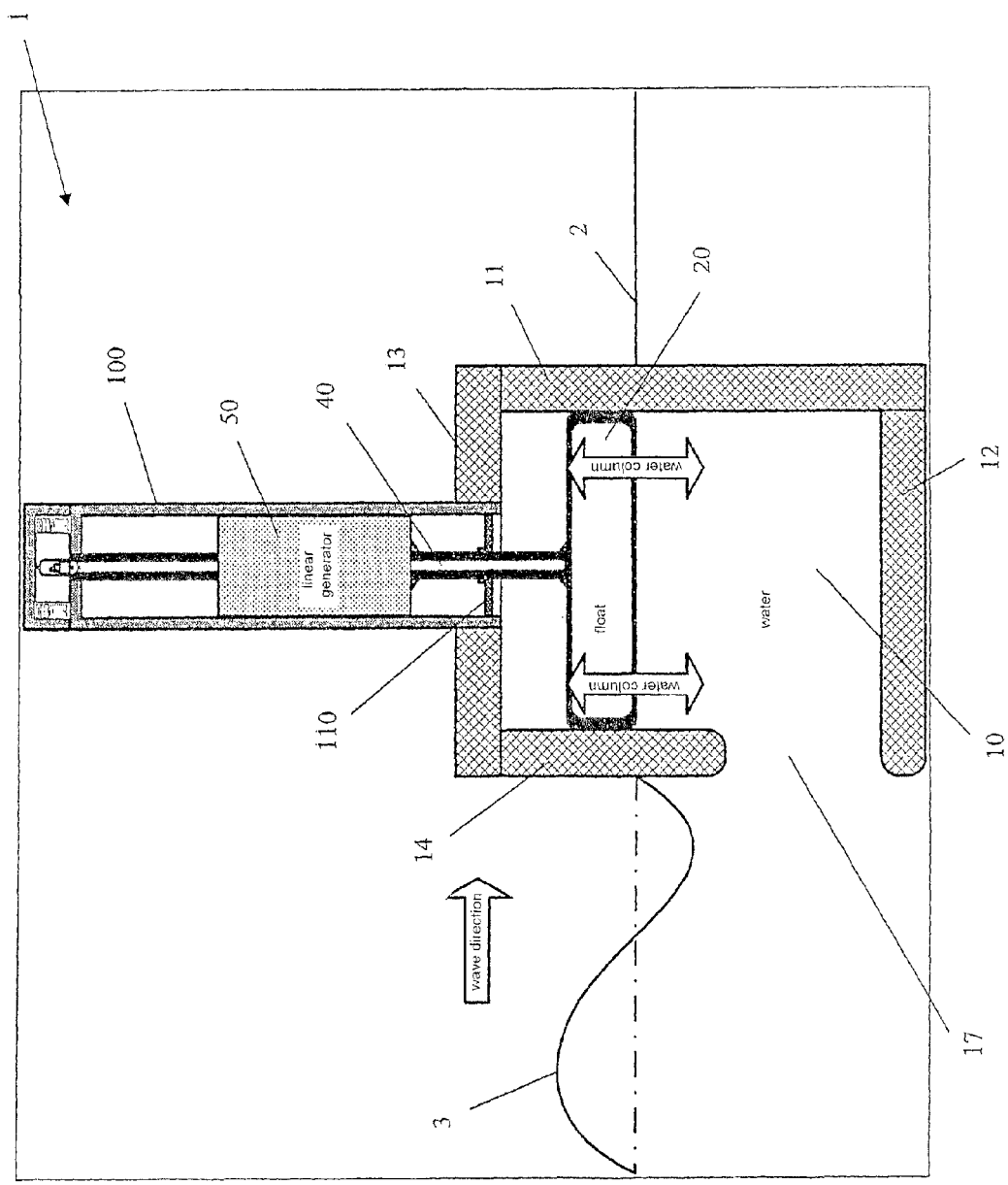
Figure 3:
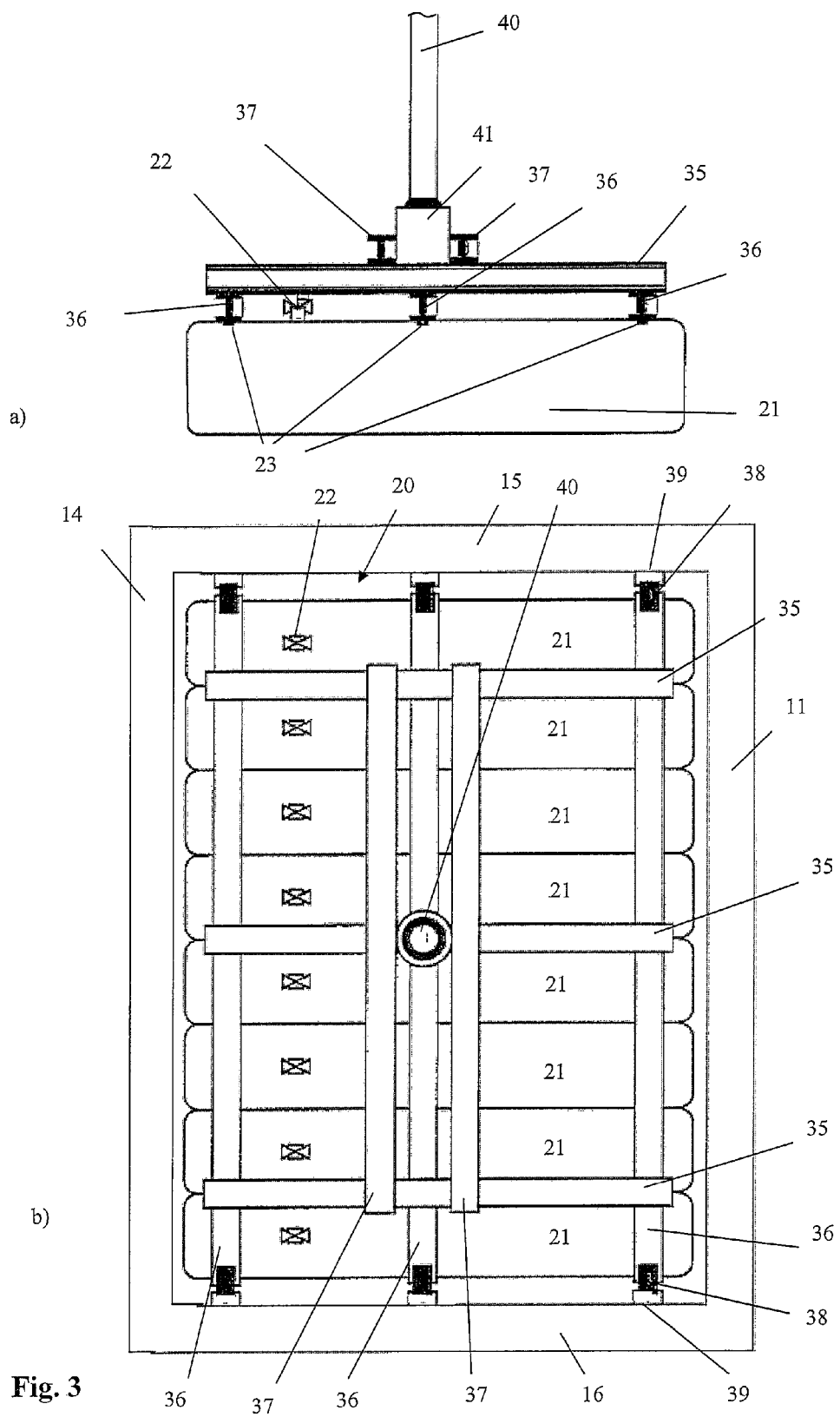
Figure 4:
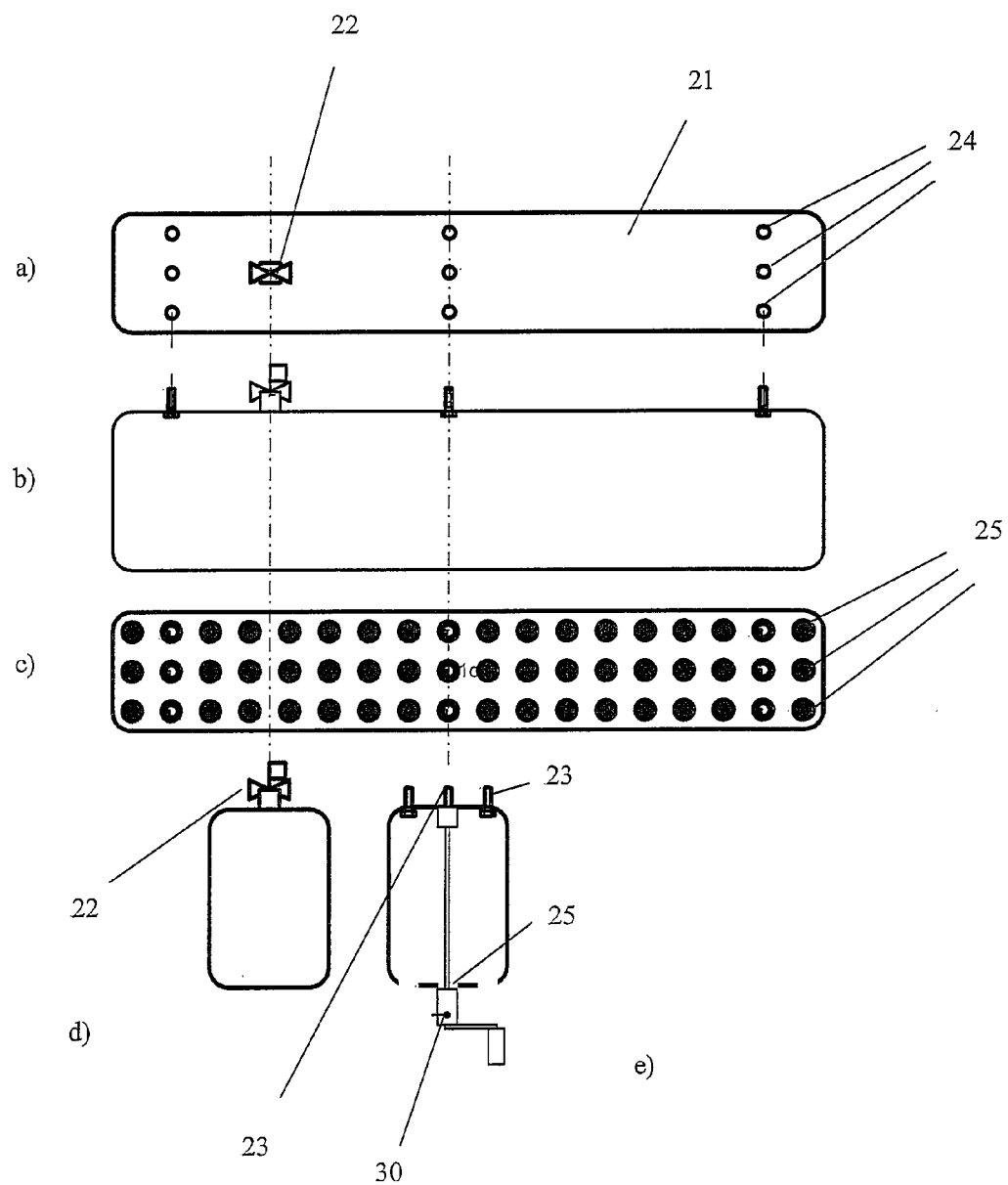
Figure 5:
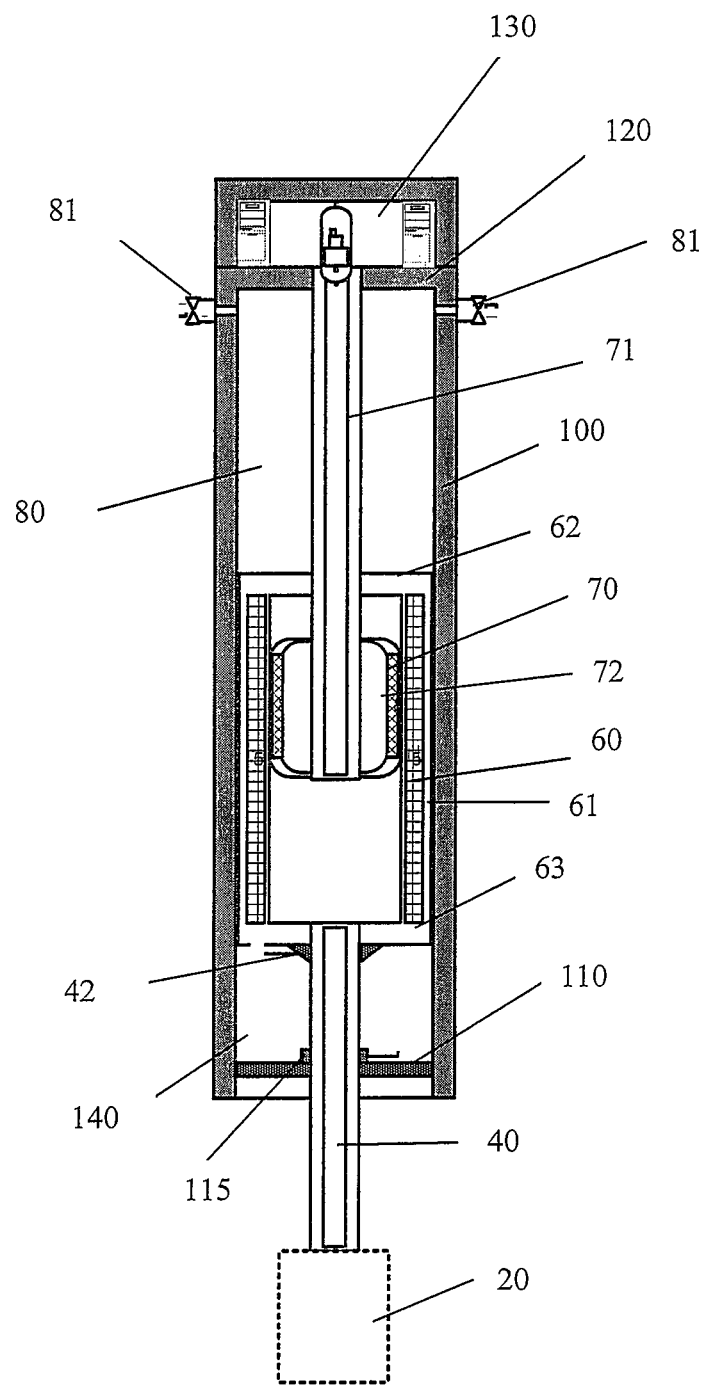
Figure 6:
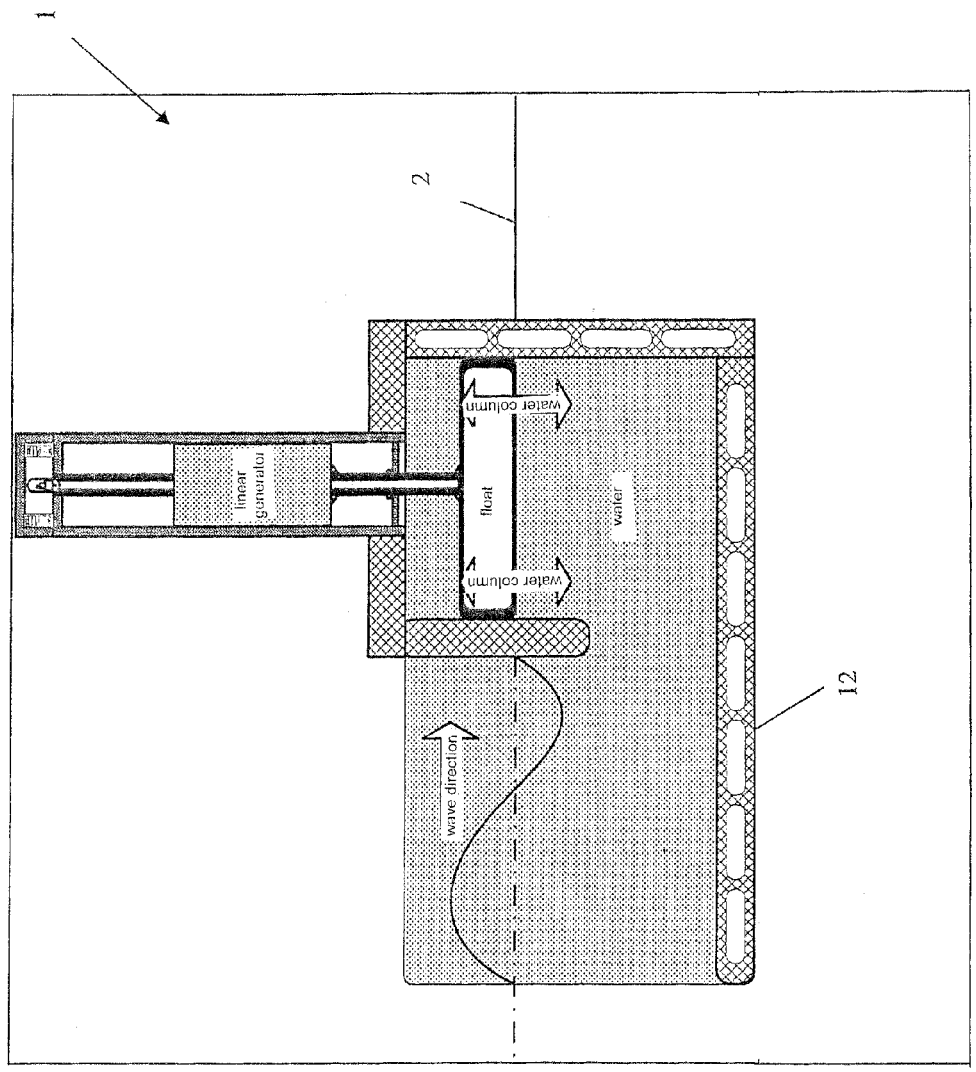
Figure 7:
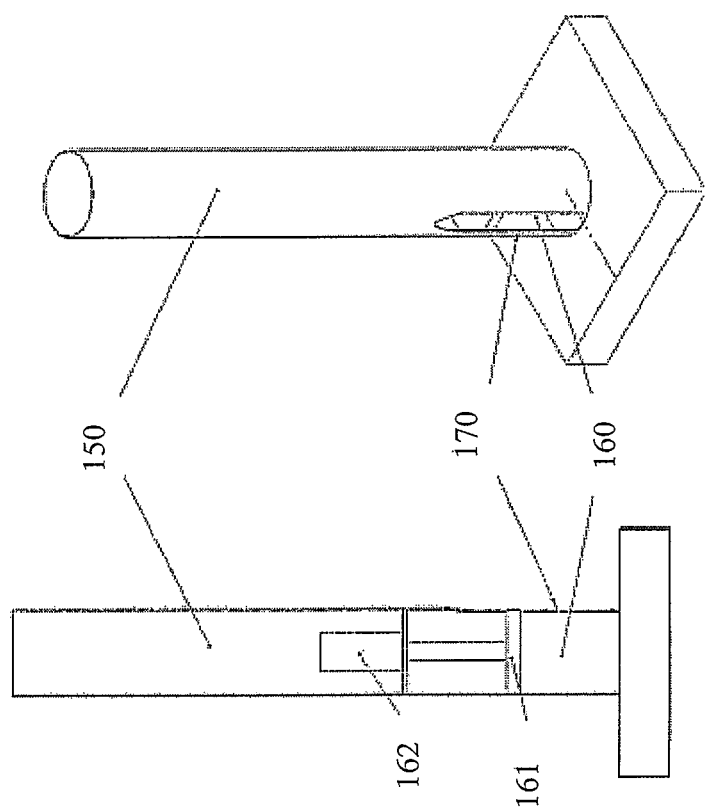
Figure 8:
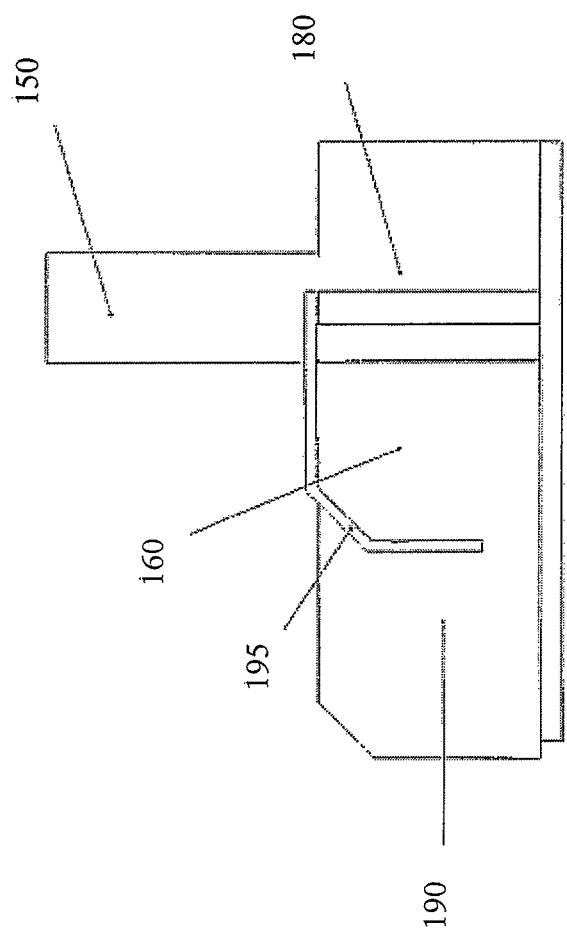
Figure 9:
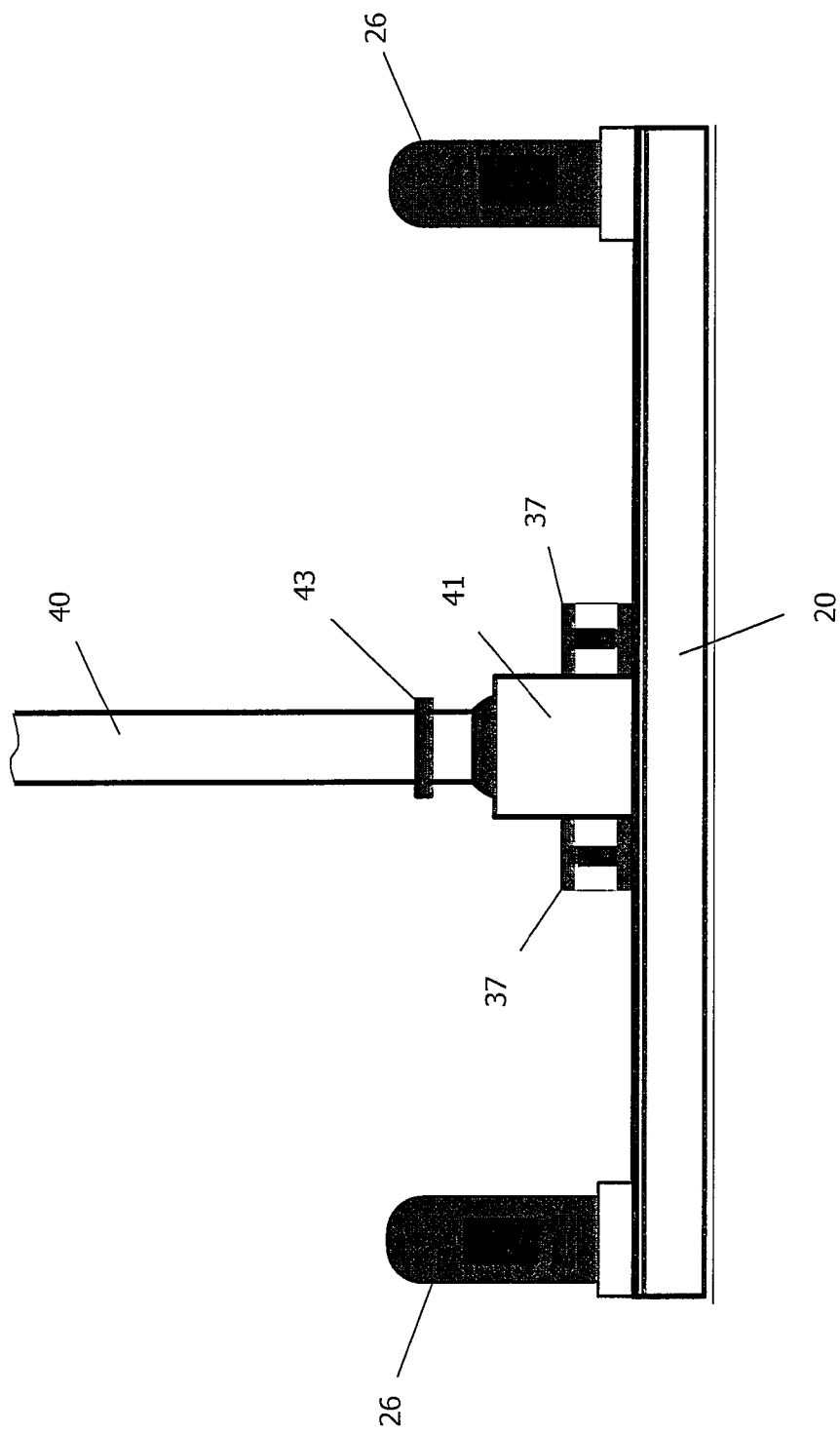

The invention is described hereinafter with reference to the accompanying drawings by the description of various embodiments and further advantageous features, wherein:

FIG. 1 is a view in cross-section of a wave power generating installation according to the invention on the basis of an oscillating water column, FIG. 2 shows a conventional wave power generating installation on the basis of an oscillating water column, FIG. 3a shows a float body device for a wave power generating installation according to the invention as shown in FIG. 1 as a side view, FIG. 3b shows a plan view of the float body device of FIG. 3a, FIGS. 4a-4d show a plan view, a side view, a view from below and two cross-sectional views of a trimmable float body of the float body device shown in FIGS. 3a and 3b, FIG. 5 shows the generator tower of the wave power generating installation according to the invention as shown in FIG. 1 together with the enclosed linear generator as a cross-sectional view, FIG. 6 shows a second embodiment of a wave power generating installation according to the invention as a cross-sectional view with an outer basin, FIG. 7 shows the installation of a wave power generating station according to the invention in a pile of a wind power installation, FIG. 8 shows the installation of a wave power generating installation according to the invention in a foundation of an offshore wind power installation, and FIG. 9 shows details of a further embodiment of a wave power generating installation according to the invention.

FIG. 1 shows a diagrammatic view in cross-section illustrating the structure of a wave power generating installation according to the invention. The chamber 10 for receiving and positively guiding the oscillating water column is of a cuboidal configuration, wherein the horizontal wall 12 which rests on the bottom, the vertical wall 11, the upper horizontal wall 13 and the vertical wall 14 directed towards the waves 3 is indicated. Below the water line 2 the wall 14 has an opening 17 through which water flows into and out of the chamber 10 depending on the wave state on the principle of communicating tubes so that a water column is afforded in the chamber, which oscillates substantially in rhythm with the sea wave 3 arriving at the outside. For example water will flow out of the chamber by way of the opening 17 in the instantaneous situation of the wave as illustrated in FIG. 1. The opening 15 is below the water level 2 so that the arriving wave cannot flow directly into the chamber. It should be pointed out that, in the cuboidal chamber described here, the opening alone extends over the wall 14 extending perpendicularly to the plane of the drawing, all other walls for constituting the chamber 10 are closed to positively guide the described water column in the chamber.

Arranged in the chamber is a float body device 20 which extends over the entire base surface of the chamber and which floats on the water column in the chamber and is entrained thereby. Fixed to the float body device 20 is a plunger 40 which transmits the movement of the float body device 20 to an actuator (not shown here) of a linear generator 50 for generating electrical energy. The plunger 40 moves for that purpose through the upper wall 13 of the chamber 10 so that the linear generator 50 is arranged outside the chamber 10. In this case the linear generator 50 is hermetically partitioned off relative to the environment in a generator tower 100 so that it is arranged in a protected condition. In that case the generator tower is mounted to the passage opening through the upper wall 13 of the chamber or is fitted thereon. In this arrangement the plunger extends in the region of the passage opening through the wall 13 through a base plate 110 which thus separates the generator chamber of the tower from the interior of the chamber 10 and thus partitions it off.

In the described embodiment the linear generator 50 and the generator tower are of a cylindrical structure.

FIGS. 3*a* and 3*b* show a structure by way of example of the float body device 20 with pivotably mounted plunger 40 as a side view in FIG. 3*a* and a plan view in FIG. 3*b*, wherein the plan view also shows the vertically extending chamber walls 11, 14 and 15, 16 as a horizontal cross-section. As can be seen from FIG. 3*b* the float body device 20 includes a multiplicity of approximately cuboidal float bodies 21 which are here elongate and which are arranged in a row with each other along their long sides and are fixed to a common carrier device which is composed of a multiplicity of steel profiles 35 through 37 which extend parallel and perpendicularly relative to each other respectively and which form a carrier frame structure and which in the described embodiment are in the form of double-T-shaped bearers. In the illustrated embodiment all float bodies 21 are of the same structure and each have a respective trimming or regulating valve 22 which is centrally actuated by a control device and the function of which is described hereinafter with reference to FIG. 4.

Roller devices in the form of rollers 38 are respectively fixed at their longitudinal ends to the steel profiles 36 of the float body structure, which rollers 38 in the upward and downward movement of the float body device 20 in the chamber roll against a respectively associated runner rail 39 which is mounted to the respective chamber wall 15, 16 and extends vertically on the wall, that is to say parallel to the direction of movement of the float body device 20. In this case the rails can also be so structured that they provide for transverse guidance perpendicularly to their longitudinal extent for the rolls or rollers. For the sake of clarity of the drawing only two of the rollers or the associated runner rails are provided with a reference.

In the illustrated embodiment of the float body device 20 only the steel profiles 36 have the described roller guides at their respective longitudinal ends. In an embodiment which is not described here, such guides and associated rails are mounted to the chamber walls at the two longitudinal ends of the vertically extending steel struts 35 so that guidance for the float body device in the chamber is implemented over the entire periphery so that the mechanical loading is minimised in relation to the lateral guidance for the rollers 38. Finally, the linear guidance for the float body device prevents twisting of the plunger and ensures better guidance for the actuator in the air gap of the linear generator. The guide system for the float body device is of a highly robust nature, due to the environment involved, for example by means of sea water-resistant rubber rollers, high-quality steel linear guides on the chamber walls, and is desirably free from chemical and low in acoustic emissions.

As can be seen from the Figures the float body device 20, except for the described linear guides 38/39, does not involve contact with the inside surface of the chamber wall, instead there is a spacing between the side and end faces of the individual float bodies 21 relative to the chamber walls 11, 14 and 15, 16 of some centimeters.

As can be seen from the side view in FIG. 3*a* a float body 21 is fixed by way of a plurality of fixing means such as for example screws 23 to the steel profiles 36. To carry transverse forces on the float body device the plunger 40 is connected to the float body device 20 by way of a cup or ball joint 41. That ensures that the linear guide of the actuator in the linear generator is not loaded by virtue of possible transverse movements of the float body device 20.

The structure of an individual float body 21 is shown in FIG. 4 in a number of views, namely a plan view (FIG. 4*a*), a side view (FIG. 4*b*), a view from below (FIG. 4*c*) and two cross-sectional views (FIGS. 4*d/e*). As can be seen from the plan view the float body 21 has a plurality of fixing openings 24, through which the respective screwthread of an associated fixing screw 23 can be passed for screwing into the steel profiles 36, see FIG. 3*a*. In the described embodiment the float body 21 at its underside, that is to say at the side towards the water column, has a multiplicity of flood holes 25, by way of which the water can penetrate into the float body in the form of a hollow body or can run out of the float body, depending on the respective position of the regulating valve 22. As can be seen from the cross-sectional view in FIG. 4*e*, flood holes and fixing openings are respectively arranged in aligned relationship at opposite side surfaces of the float body so that a suitably designed tool 30 with a fixing screw 23 fitted thereto can be inserted portion-wise through a flood hole and on the opposite side the fixing screw 23 extends with its bolt portion through the fixing hole 24. In that way the fixing screw can be screwed into an associated screwthread in the steel profile 36 for fixing the float body 31 to the carrier frame structure.

By means of automated devices the apparatus described here can also be used to provide for intermediate storage of energy in the float, as described above, that is to say to let water into the float during the upward movement and to let it out again shortly before the lower reversal point. The man skilled in the art will be able to provide numerous further devices which are in accordance with that principle.

In the described embodiment the float body device 20 is of a length of 25 m, the depth is 5 m. The overall height of the arrangement is 1 m. In that respect an individual float body in the embodiment shown in FIG. 3 or FIG. 4 is of a length of 5 m. The width of the float bodies is 50 cm, in that respect the views in FIGS. 3 and 4 are not true to scale.

As already explained the float body device 20 is composed of a plurality of separate trimming cells which are fitted from below to the receiving or carrier frame structure. In its simplest embodiment such a trimming cell is in the form of a hollow body of plastic material or the like, with the above-described openings. As a large part of the volume of the trimming cell involves air, the cell produces a corresponding buoyancy when immersed in water. The regulating valve 22 together with the flood holes 25 serves to adapt the weight of the respective trimming cell to the prevailing wave swell by means of water trimming. In that case water can flow into the respective cell through the flood holes when the regulating valve is opened so that the air in the trimming cell can escape. In order on the other hand to allow water which is in the trimming cell to flow out by way of the flood holes and thus to increase the buoyancy afforded by the respective trimming cell, compressed air can be supplied by way of the regulating valve 22 which is controllable by way of a control device, the compressed air expelling the water from the trimming cell.

In an embodiment (not shown), besides the described trimming cells, it is also possible to involve so-called tank cells which for example are of an identical structure to the trimming cells in their outside dimensions, but by virtue of a closed structure have a higher degree of stiffness and a buoyancy which is independent of operation as the air in the interior cannot be replaced by water but it is hermetically enclosed.

As already described the float body device represents a force-absorbing means for the oscillating water column, wherein the linear vertical movement of the water column is transmitted in the described embodiment to the actuator of the linear generator by way of a plunger 40. Both the pivotal mounting of the plunger to the float body device and also the actuator or the carrier device of the actuator is effected by means of a cup or ball joint 41 for carrying forces or moments which possibly occur in order not to load the linear guide arrangement of the linear generator. As an additional mounting for the plunger, provided at a base plate 110 of the generator tower 100 in the through passage for the plunger 40 is a bearing like a linear ball bearing 115, see FIG. 5, which in a diagrammatic view shows the generator tower 100 which sits on the chamber and encloses the linear generator and the plunger 40 extending through the base plate 115, with indicated float body device 20.

In the FIG. 5 embodiment the linear generator is of a cylindrical structure, the actuator 60 being carried by an actuator-carrier device in the form of a sliding tube 61, at the peripheral surface thereof. The plunger 40 is pivotably connected to the sliding tube 61 by means of a hinge 42, wherein the hinge after release at the sliding tube 61 serves as a fall-prevention safeguard to prevent the plunger 40 from unintentionally dropping into the chamber 10 after release of the hinge 42. On the other hand that construction affords the option of moving the entire float body device including the plunger on to the bottom of the chamber 10 upon installation or in a service situation after flooding of the float body device and under some circumstances the plunger and after removal of the fall-prevention safeguard 42, and removing it from the chamber opening 17, or in the reverse situation to introduce the assembled float body device including the plunger into the chamber by way of the chamber opening 17 and connect it to the linear generator.

Due to the movement of the plunger 40 the sliding tube 61 slides against the inside surface of the generator 100, thereby providing for linear guidance for the actuator of the linear generator. The stator 70 which is stationary relative to the generator tower 100 is held by a bar-shaped holding device having a bar portion 71 which at an end has a cylindrical stator-carrier device while the other end thereof is fixed centrally to a further base plate 120 of the generator tower so that the bar portion extends centrally relative to the tower. The bar portion 71 further extends through a transverse wall 62 of the sliding tube 61 so that the stator 70 is arranged in the interior of the sliding tube 61 and radially adjacent to the actuator 60. In that case the longitudinal extent of the actuator 60 is so adjusted that in operation, irrespective of the position of the water column in the chamber, the stator-carrier device 72 does not at any time strike against the transverse wall 62 or the transverse wall 63, by way of which the plunger 40 is pivotably connected to the sliding tube 61.

In the described embodiment the stator 70 includes a magnetic exciter device in the form of at least one superconducting magnet, wherein the stator-carrier device 72 is in the form of a cryostat and wherein the supply lines are passed from the supply compartment 130 which is on the base plate 120 and in which the necessary peripheral equipment such as inverter, refrigeration system, control device etc is disposed, by way of the bar portion 71. That provides for hermetic separation of the peripheral equipment from the sea water environment.

Accordingly the actuator 60 includes at least one receiving coil in which a voltage is induced by virtue of the relative movement between the actuator and the stator. From the actuator coil the energy generated is carried away, for example by way of a cable connection (not shown) between the actuator coil and an energy storage means disposed in the compartment 130. To avoid the cable connection being damaged by virtue of the movement of the actuator it is possible to provide an energy guide chain which is usual for such purposes.

Embodiments of the invention can also be implemented, in which the exciter device is moved by way of the plunger and the at least one receiving coil is arranged stationarily.

In a further embodiment (not shown) of the wave power generating installation according to the invention the stator does not include any superconducting magnetic coils as the exciter device but permanent magnets or normally conducting exciter coils.

The linear generator shown in FIG. 1 for use in a wave power generating installation according to the invention also has a gas pressure compartment 80 which operates as a gas pressure spring and the volume of which is variable by virtue of the movement of the sliding tube 61. To provide the gas pressure chamber the sliding tube 61 slides sealingly against the inside surface of the generator tower 100. In addition the through passage for the bar portion 71 to pass through the transverse wall 62 of the sliding tube is also gas-tight so that the gas pressure compartment 80 can store and deliver energy depending on the respective operating situation. In addition there is also provided at least one gas pressure valve, in the present case two gas pressure regulating valves, which are actuable by a central control so that the gas pressure spring can be switched on or also switched off as required. When the gas pressure spring is switched on and the gas pressure regulating valves 81 are closed at the moment in time at which the water column is at its lowest level and subsequently the valves 81 are held open, in the upward movement of the actuator 60, that is to say with the water column rising in the chamber 10, energy is stored in the gas pressure compartment 80, and is delivered again when the water column moves downwardly.

It should also be pointed out that the compartment 140 formed between the base plate 100, the transverse wall 63 and the inner peripheral surface of the generator tower 100 is not in the form of a gas pressure compartment in the described embodiment, for example due to the provision of openings (not shown). It is however readily possible for that compartment also to be in the form of a gas pressure compartment and to be used for the storage and delivery of kinetic energy to the system.

The wave power generating installation is controlled by a central control device. To effect optimisation of the energy input by the waves of the sea into the chamber oscillating system including the inlet, the water column, the float body device, the plunger and the linear generator, it is provided that the characteristic frequency of the system is adapted to the frequency of the waves arriving at the chamber. That can be effected on the one hand by trimming of the float bodies, but also by actuation of the linear generator for taking energy out of the system as that changes the mass relationships or in the second case the damping of the system. In addition the volume of the chamber can be altered, for example by a movable base plate of the chamber.

While the FIG. 1 embodiment of a wave power generating installation according to the invention is fixed on the bottom in shallow water the invention can also be used as a floating generating installation. FIG. 6 shows such an embodiment, wherein a part of the chamber walls is hollow to achieve greater buoyancy which finally must correspond to the weight of the overall generating installation. A further embodiment provides for the use of floatable materials (fibrous concrete, steel, plastic materials etc). In addition in the illustrated embodiment the chamber wall 12 is prolonged in the direction towards the incoming waves in the fashion of an outer basin to achieve better coupling of the energy of the waves to the generating installation. In other respects the generating installation shown in FIG. 6 is identical to that shown in FIG. 1.

FIGS. 7 and 8 show specific configurations of the invention in which the generating installation according to the invention is integrated in a pylon of an offshore wind power installation (WPI) or the gravitational foundation of such an installation. FIG. 7 shows the pylon of the wind power installation 150, in which the OWC chamber 160 is integrated, wherein water can flow into and out of the chamber through the opening 170 on the basis of the described principle. By virtue of the usually round configuration of the WPI pylon, a linear generator 162 of a cylindrical configuration is also particularly suitable in this embodiment, the linear generator acquiring its kinetic energy from a float body device 161 which here has a circular base surface.

In the FIG. 8 embodiment the generating installation is integrated in the foundation 180 of the WPI pylon 150, wherein a wave breaker 195 is provided to protect the apparatus and an outer basin wall 190 forming an outer basin is provided to adapt the incoming wave to the generating installation. It will be appreciated that the wave power generating installation according to the invention can also be integrated in other offshore constructions such as oil platforms etc.

FIG. 9 shows details of a further embodiment which in its basic structure corresponds to that shown in FIG. 3a. In that respect identical components are denoted by the same references, in which case hereinafter only the differences in the embodiments will be considered. The Figure shows the float body device 20 pivotably mounted to the plunger 40 by way of a cup or ball joint 41. To provide for shock absorption the plunger has a rubber buffer 43 in a longitudinal portion. In addition, provided on the float body device 20 are rubber buffers 26 which extend upwardly in the position of installation of the float body device to avoid the float body device striking unprotectedly against the upper inside wall of the chamber in the event of a very high input of energy into the chamber.

LIST OF REFERENCES 1 wave power generating installation
2 sea/water line
3 wave
10 chamber
11-16 chamber wall
17 chamber opening
18 through passage
20 float body device
21 float body
22 trimming/regulating valve
23 fixing screw
24 fixing opening
25 hole
26 rubber buffer
30 tool
35-37 steel profile (double-T-shaped bearer)
38 rolls/rollers
39 runner rail
40 plunger
41 cup or ball joint
42 cup or ball joint and fall-prevention safeguard
43 rubber buffer
50 linear generator
60 actuator
61 sliding tube
62 transverse wall
63 transverse wall
70 stator
71 bar portion
72 stator-carrier device/cryostat
80 gas pressure compartment
81 gas pressure regulating valve
100 generator tower
110 base plate
115 bearing
120 base plate
130 supply compartment
140 compartment
150 wind power installation (WPI) pylon
160 OWC chamber
161 float
162 linear generator
170 opening
180 foundation
190 outer basin wall for forming an outer basin
195 wave breaker
200 wave power generating station (state of the art)
205 wave
210 chamber
217 chamber opening
220 air chamber
230 air outlet/inlet opening
240 shaft turbine
250 generator

What is claimed is:

1. A wave power generating system configured to generate power based on a movement of waves, said wave power generating system comprising:
    a chamber having one single opening configured to allow water to flow into and out of the chamber, the chamber defining a water column configured to oscillate based on the movement of the waves;
    a float body disposed within the chamber, the float body configured to be carried by the oscillating water column;
    a linear generator having a stator and an actuator configured to generate electrical power, wherein the actuator is coupled to the float body device such that the actuator reciprocatingly moves relative the stator based on the movement of the float body device;
    a plunger positioned between the float body device and the actuator;
    a control device configured to adjust a characteristic frequency of the wave power generating system to a frequency of the waves arriving at the chamber based by causing at least one of actuation of the linear generator for taking off energy, trimming of the float body device by the actuation of at least one valve device, or adjustment of an operating parameter of an actuator-carrier device mechanically operatively connected to the plunger.

2. A wave power generating system as set forth in claim 1 wherein the plunger is coupled to a longitudinal end of the actuator-carrier device, and wherein the plunger is positioned between the float body device and the actuator.

3. A wave power generating system as set forth in claim 1 wherein the plunger is positioned between the float body device and the actuator, and wherein the plunger has an elastic buffer device configured to absorb shock.

4. A wave power generating system as set forth in claim 1, wherein the plunger is pivotably coupled to at least a portion of the actuator-carrier device and at least a portion of the float body device by means of a hinge arrangement.

5. A wave power generating system as set forth in claim 1 further comprising a roller mechanism configured to provide linear guidance to the float body device during movement of the float body device, wherein the roller mechanism is fixed to the float body device and supported against an inside wall of the chamber.

6. A wave power generating system as set forth in claim 1 wherein the float body device defines a plurality of float bodies secured to a common carrier device.

7. A wave power generating system as set forth in claim 6 wherein at least one float body of the plurality of float bodies defines a hollow body having at least one opening and the at least one valve device, wherein the at least one valve device is configured to allow air into and out of the hollow body.

8. A wave power generating system as set forth in claim 1, wherein the linear generator is positioned outside the chamber, and wherein the plunger is configured to movably extend through an upper wall of the chamber.

9. A wave power generating system as set forth in claim 1, wherein at least a portion of the actuator-carrier device defines at least a portion of a gas pressure compartment, wherein the gas pressure compartment is configured to operate as a gas pressure spring, and wherein a volume of the gas pressure compartment can be altered by movement of the plunger.

10. A wave power generating system as set forth in claim 1, wherein at least a portion of the actuator-carrier device includes a spring mechanism coupled to the plunger, the spring mechanism configured to be deflectable from a resting position by movement of the plunger.

11. A wave power generating system as set forth in claim 1, wherein the linear generator is cylindrical and the actuator-carrier device comprises a sliding tube configured to carry the actuator at a peripheral surface defined on the sliding tube, wherein the sliding tube is movable within a hollow cylinder, the hollow cylinder being stationary relative to the actuator.

12. A wave power generating system as set forth in claim 11 further comprising a holding mechanism defining a bar portion and a carrier portion, configured to hold the stator in a stationary position within the hollow cylinder, wherein the holding mechanism extends parallel to the axis of the hollow cylinder.

13. A wave power generating system as set forth in claim 12 wherein the bar portion extends through a transverse wall of the sliding tube and is positioned within an interior portion of the sliding tube and radially adjacent to the actuator of the linear generator.

14. A wave power generating system as set forth in claim 1, wherein the linear generator is cylindrical and the actuator-carrier device comprises a cylinder configured to carry the at a peripheral surface defined on the cylinder, wherein the cylinder is movable within a hollow cylinder, the hollow cylinder being stationary relative to the actuator.

15. A wave power generating system as set forth in claim 14 wherein the hollow cylinder defines a transverse wall having an opening through which the plunger movably extends.

16. A wave power generating system as set forth in claim 6, wherein said a control device is configured to control accommodation of water in at least one float body of the plurality of float bodies of the float body device.

17. A wave power generating system as set forth in claim 1 wherein the linear generator comprises electrically excitable magnets.

18. A wave power generating system as set forth in claim 1 wherein the linear generator comprises superconducting magnets.

19. A wave power generating system as set forth in claim 2 further comprising closable air openings for adjusting and/or regulating the power delivered by means of the plunger to the linear generator.

20. A wave power generating system as set forth in claim 1 further comprising a buffer device positioned on at least a portion of the float body device and configured to absorb shock and/or pressure forces, wherein the buffer device is configured to be supported against an inner wall of the chamber and limit and/or dampen the movement of the float body device.

21. A wave power generating system as set forth in claim 1 further comprising a buffer device positioned on at least a portion of an inner wall of the chamber and configured to absorb shock and/or pressure forces, wherein the buffer device is configured to support the float body device and limit and/or dampen movement thereof.

22. A wave power generating system configured to generate power based on a movement of waves, said wave power generating system comprising:
   a chamber defining a water column configured to oscillate based on the movement of the waves;
   a float body disposed within the chamber, the float body configured to be carried by the oscillating water column;
   a linear generator including a stator and an actuator configured to generate electrical power, wherein said actuator is coupled to the float body device by a plunger such that the actuator reciprocatingly moves relative to the stator based on the movement of the float body;
   a gas pressure compartment configured to bias the actuator; and
   a control device configured to adjust oscillating frequency of the chamber to the frequency of the waves arriving at the chamber based on at least one of actuating the linear generator for taking off energy out of the system, trimming of the float body device by actuating at least one valve device or adjusting an operating parameter of the gas pressure compartment.

* * * * *

UNITED STATES PATENT AND TRADEMARK OFFICE
CERTIFICATE OF CORRECTION

PATENT NO. : 8,541,901 B2
APPLICATION NO. : 12/795008
DATED : September 24, 2013
INVENTOR(S) : Jörg Folchert et al.

Page 1 of 1

It is certified that error appears in the above-identified patent and that said Letters Patent is hereby corrected as shown below:

In the Claims

In column 16, line 3, in Claim 14, before "at" insert -- actuator --, therefor.

In column 16, line 11, in Claim 16, after "said" delete "a".

Signed and Sealed this
Fourth Day of February, 2014

Michelle K. Lee
*Deputy Director of the United States Patent and Trademark Office*